Jan. 22, 1924.
W. C. CREVELING
ANIMAL RACING TRACK
Filed Dec. 29, 1921
1,481,313
2 Sheets-Sheet 1
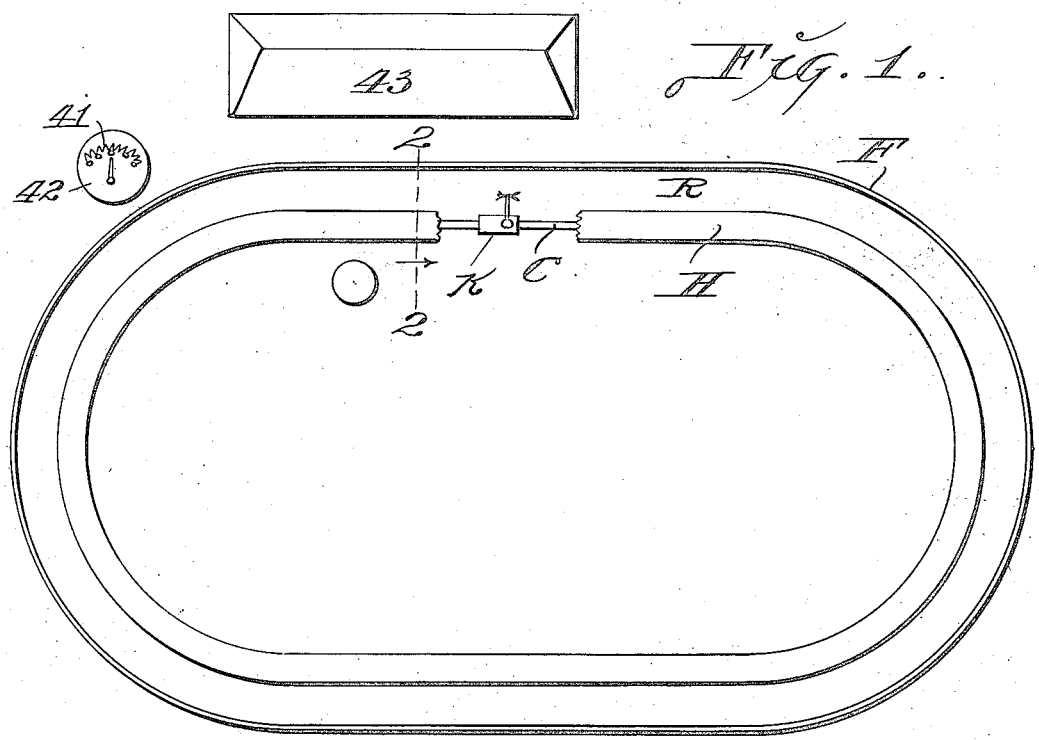
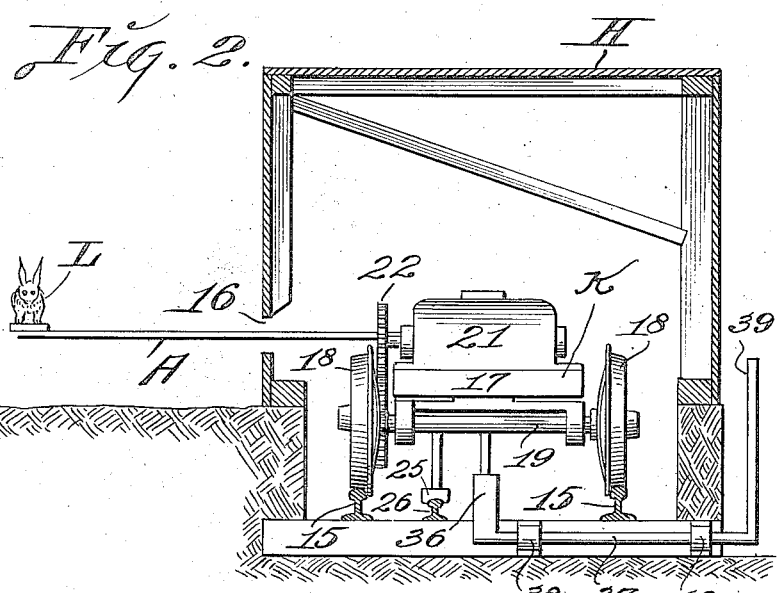
INVENTOR:—
WM. C. CREVELING.
By Hazard & Miller
ATTORNEYS.

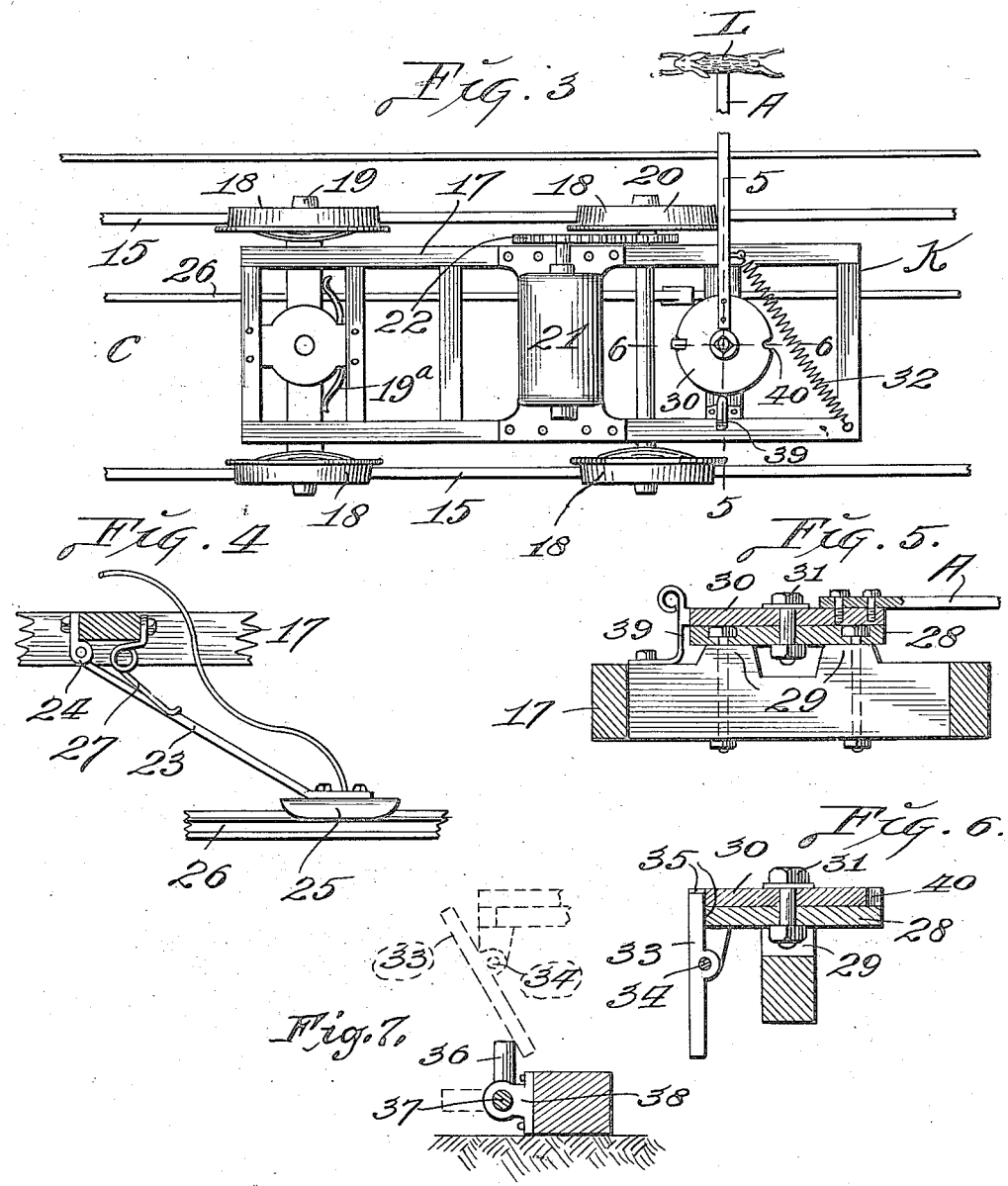

Patented Jan. 22, 1924.

1,481,313

UNITED STATES PATENT OFFICE.

WILLIAM C. CREVELING, OF LOS ANGELES, CALIFORNIA, ASSIGNOR OF ONE-THIRD TO WILLIAM W. FINN, OF SAN DIEGO, CALIFORNIA, ONE-THIRD TO JOHN O. TALBOTT, OF DENVER, COLORADO, AND ONE-SIXTH TO AGNES CREVELING, OF LOS ANGELES, CALIFORNIA.

ANIMAL RACING TRACK.

Application filed December 29, 1921. Serial No. 525,533.

*To all whom it may concern:*

Be it known that I, WILLIAM C. CREVELING, a citizen of the United States, residing at Los Angeles, in the county of Los Angeles and State of California, have invented new and useful Improvements in Animal Racing Tracks, of which the following is a specification.

My invention relates to animal racing apparatus of that character in which dogs or other like animals are induced to race about a track by means of a lure or object conveyed mechanically along the track.

A purpose of my invention is the provision of a racing apparatus of the above described character including a lure conveying car which is movable over a conveyor track arranged within the area defined by the race track to permit of the forming of endless race and conveyor tracks so that the animals can be induced to traverse the entire race track one or more times.

It is also a purpose of my invention to provide a racing apparatus in which the lure conveying car is so constructed as to insure of its easy and unrestricted movement over the conveyor track, and one which includes a lure sustaining arm and means co-operating therewith for automatically causing a retraction of the arm from the race track to effect a termination of a race.

I will describe one form of racing apparatus embodying my invention and will then point out the novel features thereof in claims.

In the accompanying drawings,

Figure 1 is a view showing in top plan a race track having applied thereto one form of racing apparatus embodying my invention.

Fig. 2 is an enlarged vertical sectional view taken on the line 2—2 of Fig. 1.

Fig. 3 is a top plan view of the lure conveying car comprised in the apparatus shown in the preceding views.

Fig. 4 is a fragmentary view partly in section showing the current collector and constituting a part of the conveyor car shown in Fig. 3.

Fig. 5 is an enlarged transverse section taken approximately on the line 5—5 of Fig. 3.

Fig. 6 is an enlarged cross section taken on the line 6—6 of Fig. 3, and with dotted lines showing a tripping device for a movable part of the apparatus.

Fig. 7 is a view similar to Fig. 6 showing one form of trip embodying my invention in engaging position with respect to the latch device.

Similar reference characters refer to similar parts in each of the several views.

Referring specifically to the drawings, my invention, in its present embodiment, comprises a race track R over which the animals are adapted to travel, this track, in the present instance, being of endless form as shown in Fig. 1 and encircled by a partition or fence F. At the inner side of and in a plane below the track R, is a conveyor track C also endless and including track rails 15 over which a lure conveying car designated generally at K is adapted to travel. The conveyor track and car are concealed and protected from the elements by a housing H formed on its track side with a relatively narrow slot or passage 16 in which is adapted to travel an arm A having a lure L supported thereon in the manner clearly shown in Fig. 2.

As illustrated to advantage in Fig. 3, the conveyor car K includes a chassis 17 supported for movement over the rails by means of wheels 18 fixed to axles 19 and 20, the former axle constituting the front axle of the car and being swivelly sustained on the chassis to allow of the necessary movement of the front wheels when traversing the endless curved protions of the track C. This swiveled front axle is yieldingly maintained in normal position by a suitable spring or springs, such as 19$^a$, that are secured to a fixed portion of the chassis and bear on the rear side of said front axle at points to the sides of its axis of swinging movement. The axle 20 constitutes the rear and driving axle of the car and is adapted to be driven by an electric motor 21 through the medium of gears 22. Current is conveyed to the motor M by means of a current collector which, as clearly shown in Fig. 4, includes an arm 23 pivoted upon the chassis at the point indicated at 24 and carrying a shoe 25 normally urged into contact with the third rail 26 by means of a spring 27.

As shown in Fig. 5, a stationary disc 28 is fixedly secured upon a yoke 29 rising from the chassis 17 and suitably secured thereto. Arranged in superimposed relation with respect to the disc 28 is a movable disc 30 mounted for rotational movement by means of a bolt 31 extending axially through both of said discs. The disc 30 forms a support for the arm A with the latter bolted thereto in the manner shown in Fig. 5 and extending radially therefrom with the lure L mounted on the outer end of the latter. The arm A and consequently the disc 30 is normally urged to a retracted position with respect to the race track R and the slot 16 so that the lure is disposed within the housing H. This is effected through the medium of a coiled contractile spring 32 secured at one end to the arm A and at its opposite end to the chassis 17, all in the manner clearly shown in Fig. 3.

To maintain the arm A in projected position wherein the lure L is disposed directly above the track R, a latch 33 pivoted at the point 34 is adapted to engage within recesses 35 formed in the discs 28 and 30 so as to lock the disc 30 against rotation upon the disc 28. This latch 33 is normally urged to latching position through the action of gravity, but is adapted to be moved to releasing position by means of a trip 36 located between the track rails 15 and in the path of movement of the latch 33. The trip 36 is capable of tripping and non-tripping positions, and to this end it is mounted on a shaft 37 journaled in bearings 38 and provided with an operating crank 39 which can be extended to any suitable point for operation as will be understood from the consideration of Fig. 2.

To provide positive means for securing the arm A in retracted position and to prevent any swaying movement thereof when in such position, a spring latch 39 is secured to the yoke 29 so as to engage in a notch 40 formed in the movable disc 30, it being clear by consideration of Fig. 3 that the notch is in registration with the latch only when the arm A is in retracted position.

In the operation of the racing apparatus, the supply of current to the motor 21 of the conveyor car is controlled by rheostat 41 within a tower 42 adapted to be occupied by an operator and located at one side of the track as clearly shown in Fig. 1. A grandstand 43 may be provided for accommodation of the audience, as is clearly shown in Fig. 1. When current is supplied to the motor, a driving of the rear wheels 18 is effected to cause forward movement of the car K, and with the arm A in extended position to dispose the lure within the race track, which lure is caused to rapidly move along and above the track thereby inducing the animals to race about the track as will be understood. By virtue of the fact that the conveyor track is endless, the lure can be continuously moved throughout the entire length of the race track thereby inducing the animals to traverse the track as many times as desired.

When it is desired to terminate the race, the trip 36 is moved to tripping position so that when the car passes its point, the latch 33 will engage the trip and thus be moved free of the disc 30 to allow the spring 32 to effect a retraction of the arm A so that the lure is drawn into the housing and out of sight of the animals.

Although I have herein shown and described only one form of racing apparatus embodying my invention, it is to be understood that various changes and modifications may be made herein without departing from the spirit of the invention and the spirit and scope of the appended claims.

I claim as my invention:

1. A racing apparatus of the character described comprising an endless race track, an endless conveyor track within the area defined by the race track, a slotted housing for the conveyor track, a car movable over the conveyor track and within the housing, a lure supporting arm, a horizontally arranged movable member pivotally mounted on the car and having said arm rigidly connected therewith, a latch on the car adapted to be engaged with said member to lock the latter in the operative position of the lure, a trip member adapted to engage said latch to release said member, and means connected with said arm and car adapted to automatically retract the lure from the track to an inoperative position.

2. In a racing apparatus of the character described, a race track, a conveyor track, a housing for the conveyor track, a car movable over the conveyor track, and a lure sustaining arm movably supported on the car to occupy an extended position in which the lure is disposed in the race track, a lock for said arm in said position, means for releasing said lock, and a device connected with said arm and a member on the body of the car automatically acting to place said arm in a retracted position in which the lure is withdrawn into the housing.

3. In a racing apparatus of the character described, a race track, a conveyor track, a housing for the conveyor track, a car movable over the conveyor track, a lure sustaining arm movably supported on the car to occupy an extended position in which the lure is disposed in the race track and a retracted position in which the lure is withdrawn into the housing, means for normally urging the arm to the retracted position, means for retaining the arm in extended position, and means for releasing said retaining means to effect a retraction of said arm at a predetermined point within the race track.

4. In a racing apparatus of the character described, a car, a lure supporting arm movably sustained on the car to occupy either of two extreme positions, means for urging the arm to one extreme position, means for retaining the arm in the other extreme position against the action of said urging means, and means disposed in the path of movement of said retaining means for releasing the latter to permit said arm to respond to the action of said urging means.

5. In a racing apparatus of the character described, a car, a lure supporting arm movably sustained on the car to occupy either of two extreme positions, means for urging the arm to one extreme position, means for retaining the arm in the other extreme position against the action of said urging means, and a trip disposed in the path of movement of said retaining means movable to occupy tripping and nontripping positions with relation to said retaining means.

6. In a racing apparatus of the character described, a car, a stationary member sustained on the car, a movable member mounted on said stationary member, a lure arm fixed to the movable member, means for urging the arm and movable member to one extreme position, a latch for securing the movable member in another extreme position against the action of said urging means, and a trip adapted to be engaged by said latch for moving the latter to released position with respect to the movable member.

7. In a racing apparatus of the character described, a car, a disc fixedly secured to the car, a second disc movably sustained on the first disc, an arm fixed to the movable disc, a spring associated with said arm for urging the latter to one extreme position, a spring latch engageable with said discs for retaining the arm in urged position, a gravity latch engaging the discs for securing the arm in another extreme position against the action of said spring, and a trip for moving the gravity latch to released position.

8. A racing apparatus of the character described comprising an endless race track, a conveyor track within the area defined by the race track, a car movable over the conveyor track, a lure supporting arm sustained on the car for movement over the race track, a latching device for said arm in the operative position of the lure, means for releasing said device, and means connected with said arm and the car adapted to automatically retract the arm to an inoperative position for the lure.

9. A racing apparatus of the character described comprising an endless race track, an endless conveyor track within the area defined by the race track, a car movable on said conveyor track, a housing on the conveyor track, said housing having a passage in its side, a lure carrying arm rotatably mounted on the car, said arm being movable in opposite direction in said passage, a lock for said arm in the operative position of the lure, means for releasing said lock, and means for automatically retracting said arm to an inautomatic position of said lure in said housing.

In testimony whereof I have signed my name to this specification.

WILLIAM C. CREVELING.